United States Patent [19]

Jerde et al.

[11] Patent Number: 4,627,740

[45] Date of Patent: Dec. 9, 1986

[54] SELF-CALIBRATING TEMPERATURE PROBE APPARATUS AND METHOD FOR USE THEREOF

[75] Inventors: James B. Jerde, Scotts Valley; James E. Vasbinder, San Jose, both of Calif.

[73] Assignee: Digital Dynamics, Inc., Scotts Valley, Calif.

[21] Appl. No.: 597,511

[22] Filed: Apr. 6, 1984

[51] Int. Cl.⁴ .................................................. G01K 15/00
[52] U.S. Cl. .......................................... 374/1; 374/25; 374/102
[58] Field of Search ................ 374/1, 3, 25, 102, 107, 374/182

[56] References Cited

U.S. PATENT DOCUMENTS

| | | | |
|---|---|---|---|
| 2,379,459 | 7/1945 | Schreiber et al. | 116/207 |
| 2,854,844 | 10/1958 | Howell | 374/1 |
| 3,270,547 | 9/1966 | MacRitchie et al. | 374/3 |
| 3,313,140 | 4/1967 | Trementozzi | 374/182 |
| 3,456,590 | 9/1969 | Kluth et al. | 374/162 |
| 3,499,310 | 3/1970 | Hundere et al. | 374/1 |
| 3,504,525 | 4/1970 | Ishii | 374/25 |
| 4,011,552 | 3/1977 | Quirke | 374/1 |
| 4,133,208 | 1/1979 | Parlanti | 374/178 |
| 4,383,770 | 5/1983 | Boschung et al. | 374/25 |
| 4,488,824 | 12/1984 | Salem | 374/178 |

FOREIGN PATENT DOCUMENTS

| | | | |
|---|---|---|---|
| 1021591 | 11/1977 | Canada | 374/1 |
| 1020574 | 3/1966 | United Kingdom | 374/1 |

*Primary Examiner*—Charles Frankfort
*Assistant Examiner*—Thomas B. Will
*Attorney, Agent, or Firm*—Thomas E. Schatzel

[57] ABSTRACT

A self-calibrating temperature sensing probe having a temperature sensor positioned adjacent to a vial of a predetermined substance in an isothermal environment created by a housing and insulation. A heating element is positioned about the vial to effect vial heating. The substance is preselected for its melting point temperature, which is in excess of the ambient temperature of the environment surrounding the housing. During recalibration the substance is heated above its melting point and allowed to cool. During cooling the temperature of the substance is recorded and the liquid-to-solid phase change determined. Recalibration is affected using the phase change temperature of the substance as a calibration point.

20 Claims, 5 Drawing Figures

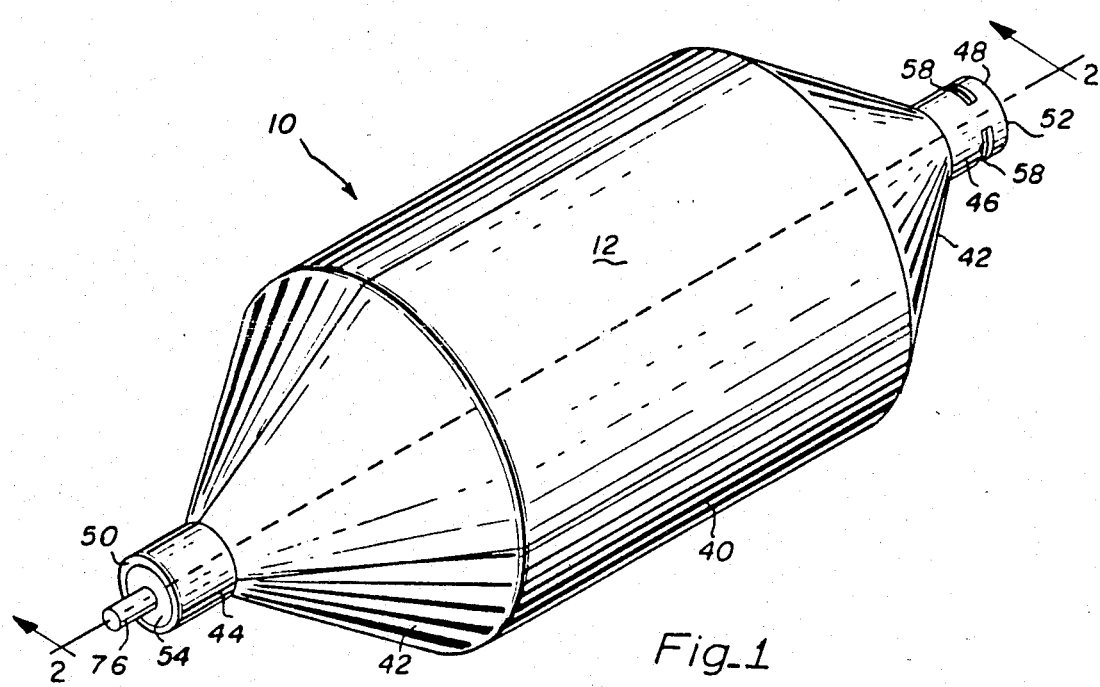
Fig_1
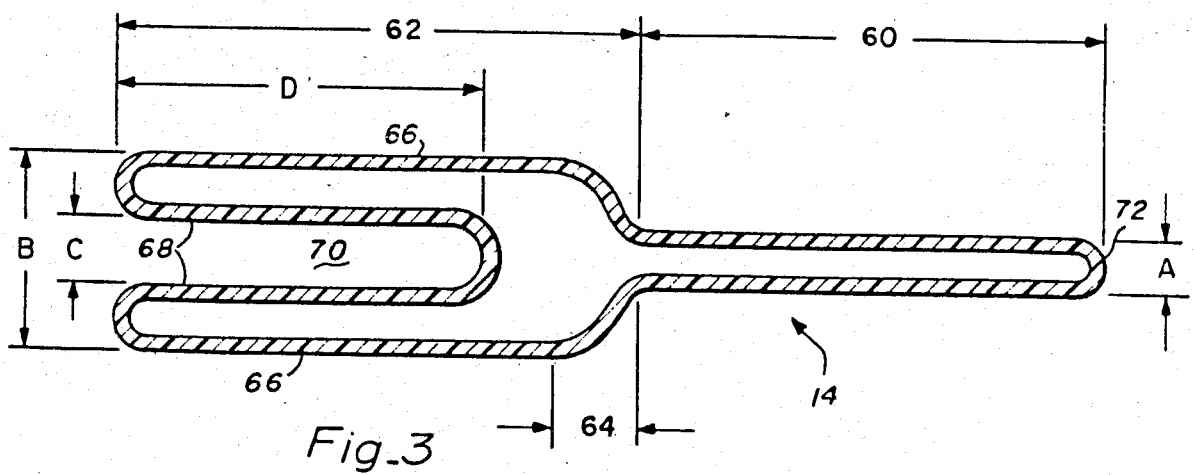
Fig_3
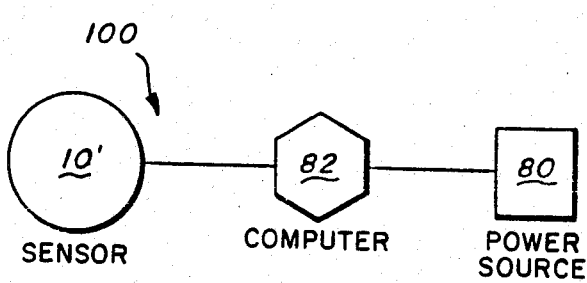
Fig_4
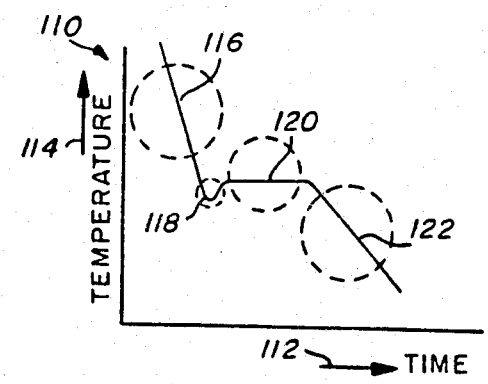
Fig_5

SELF-CALIBRATING TEMPERATURE PROBE APPARATUS AND METHOD FOR USE THEREOF

BACKGROUND OF THE INVENTION

1. Field of the Invention

The invention relates generally to temperature sensor probes and more particularly to self-calibrating temperature sensor probes and a method for use thereof.

2. Description of the Prior Art

Self-calibrating temperature sensor probes are known in the prior art. Such probes utilize electronic componentry to establish reference values from which the temperature sensor is calibrated. Typically, the electronic componentry includes a digital computer, an analog-to-digital converter, an amplifier, a multiplexer, and a precision voltage source. In use the temperature sensor generates a voltage which is amplified by the amplifier, converted into digital signals by the analog-to-digital converter and interpreted as a temperature value by the computer. Calibration is effected by comparing the temperature sensor voltage to a voltage generated by the precision voltage source. Such comparison is accomplished by the multiplexer switching the computer input from the temperature sensor to the precision voltage source and passing such voltage through the amplifier, the analog-to-digital converter and into the computer. There are numerous disadvantages to the prior art.

One disadvantage of the prior art is that the precision voltage source does not provide an absolute temperature reference point for calibration. The generated voltage may drift over time thereby preventing accurate temperature probe calibration.

Another disadvantage of the prior art is that it is expensive to manufacture.

Another disadvantage of the prior art is that it fails to adjust for electronic drift in the sensor over time thereby preventing accurate temperature sensor calibration.

Another disadvantage of the prior art is that it does not provide a self-calibrating temperature sensor probe that can accomplish highly accurate maintenance free automatic calibrations over time.

SUMMARY OF THE PRESENT INVENTION

It is therefore an object of the present invention to provide a self-calibrating temperature probe that is inexpensive to manufacture.

It is a further object of the present invention to provide a self-calibrating temperature probe that provides an absolute reference point for accurate, automatic temperature sensor calibration.

It is a further object of the present invention to provide a self-calibrating temperature probe capable of performing highly accurate temperature sensor calibration without adjustment over prolonged periods of time.

Briefly, a preferred embodiment includes a vial, a heating element, a temperature sensor, insulation and an outer housing. The vial is filled with a preselected substance that has a melting point temperature normally in excess of the ambient temperature surrounding the housing. The heating element is wrapped about the vial and is designed to heat the substance above the substance's melting point. Adjacent to the vial is the temperature sensor. The sensor is designed to accurately sense the temperature of the substance. About the heater element and the vial is the insulation. The insulation serves two purposes; to thermally isolate the temperature sensor and a portion of the substance from the ambient temperature and the housing and to make the probe water proof. The outside housing is of greater diameter and length than the vial, and encloses all of the aforementioned components. The outer housing is shaped so as to expose a select portion of the vial to the environment and the ambient temperature.

The probe provides a constant non-linearity which can be used as a reference temperature for sensor calibration. Prior to calibration cycle the substance is at the ambient temperature. Due to the choice of the substance it is a solid at such a temperature. During calibration the substance is heated by the heater element to a temperature in excess of its melting point. At such a temperature the substance is a liquid. Once heated the liquid is allowed to cool. During cooling the liquid undergoes a phase change and resolidifies. The phase change occurs at the substance's melting point temperature. While the substance is cooling, but before the phase change occurs, the temperature sensor, which may be connected to a computer or some other long term recording device, senses and records the temperature of the substance as it cools. The temperature sensor records the substance's temperature at predetermined time intervals over a predetermined period of time, allowing a rate-of-change computation. Upon reaching its melting point the substance undergoes a liquid-to-solid phase change, during which the temperature of the substance remains constant, and the rate-of-change drops to approximately zero. Subsequent to the phase change, the temperature continues to drop. Represented graphically with time being the horizontal axis and temperature being the vertical axis, the phase change of the substance is represented as a near flat curve preceded and followed by negative sloping curves. The near horizontal portion of the curve represents the melting point of the substance. The constant reference temperature is the melting point of the substance determined by the near zero slope of the temperature curve. Determination of this slope is accomplished comparing the temperature rate of change of the substance with a preselected known melting point temperate rate of change for the same substance under similar conditions. When the rate of temperature change for the substance is equivalent to the preselected known melting point temperature rate of change the substance is undergoing its phase change and recalibration can take place. Thus, the melting point temperature of the substance can be used as a temperature sensor calibration point. The melting point of the substance is constant over time and not subject to drift providing the temperature probe with a reliable and absolute calibration reference.

Super cooling of the substance can prevent an accurate evaluation of the phase change temperature. When uncontrolled super cooling occurs the substance cools significantly below its melting point temperature without undergoing a phase change. Typically, a substance will undergo such super cooling when it is relatively pure and is cooled very gradually. The phase change in such super cooled substances occurs rapidly and, under certain circumstances, does not occur at the substance's melting point. When such super cooling transpires and phase change occurs at temperatures lower than the melting point temperature, no suitable reference calibration point is provided.

To avoid such super cooling, a small portion of the vial is constantly exposed to the ambient temperature and/or a nucleating substance such as finely ground glass or sand is added to the liquid. The ambient temperature is always below the substance's melting point. The substance in the vial so exposed to the ambient temperature remains a solid throughout the probe's calibration. The solid portion of the substance within the vial or the nucleating substance provides a "seed" for the phase change. When such a seed is present and the substance cools the seed acts as a catalyst for a proper phase change and super cooling is avoided.

An advantage of the present invention is that it is inexpensive to manufacture.

Another advantage of the present invention is that it provides a set point calibration reference temperature not affected by drift in sensor chacteristics.

Another advantage of the present invention is that it provides a self-calibrating temperature sensor probe that is capable of accomplishing highly accurate automatic temperature recalibration over time without maintenance.

These and other objects and advantages of the present invention will no doubt become obvious to those of ordinary skill in the art after having read the following detailed description of the preferred embodiments which are illustrated in the various drawing figures.

IN THE DRAWING

FIG. 1 illustrates a perspective view of a self-calibrating temperature sensor probe according to the present invention;

FIG. 3 is a cross-sectional view of a containment vial according to the present invention taken along line 2—2 of FIG. 1;

FIG. 4 is a schematic view of an alternative embodiment of the present invention; and FIG. 5 is a graphical representation of the time-temperature relationship for a hypothetical substance utilized in the present invention during cooling.

DETAILED DESCRIPTION OF THE PREFERRED EMBODIMENT

Figure 2:
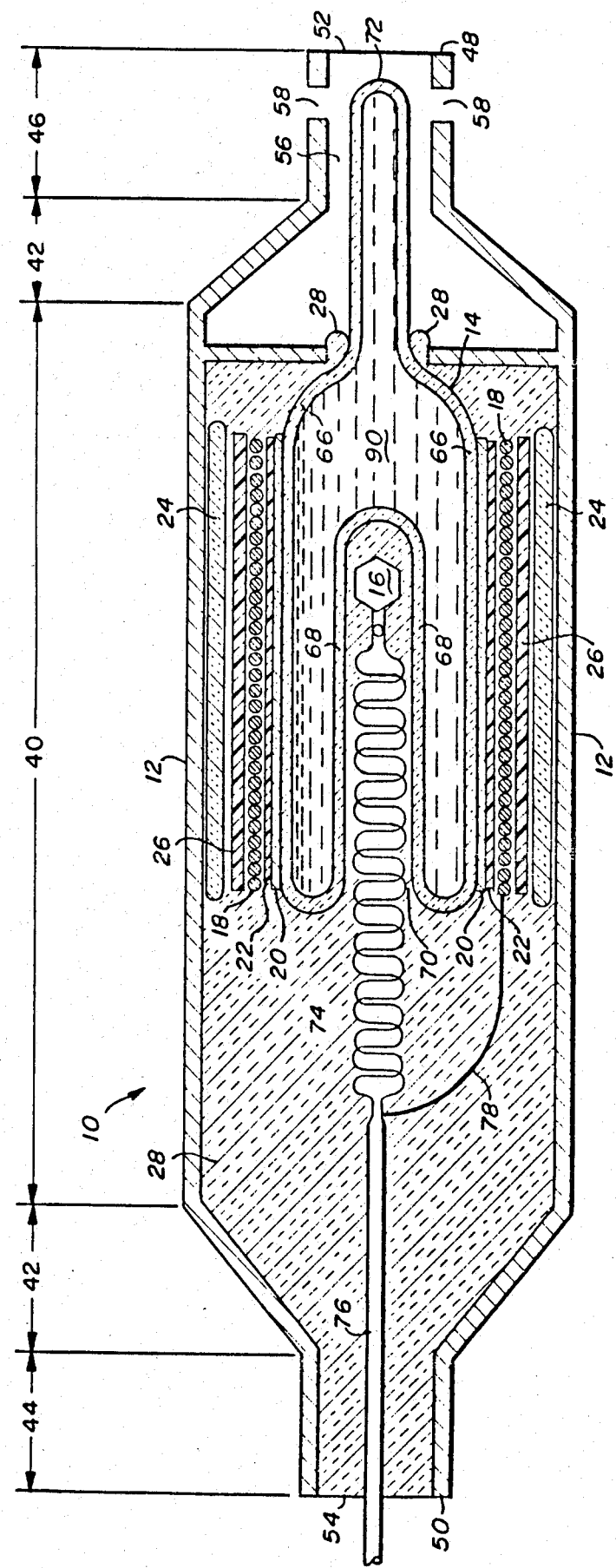
FIG. 2 is a cross-sectional view of the temperature probe of FIG. 1 taken along line 2—2.

Referring to FIGS. 1 and 2 there is shown a self-calibrating temperature probe referred to by general reference character 10. Probe 10 includes a housing 12, a vial 14, a temperature sensor 16, a temperature control element 18, a layer of aluminum foil 20, a layer of double-sided adhesive tape 22, a layer of foam insulation 24, a layer of encapsulant 26, a quantity of sealer 28, and a quantity of preselected substance 90.

Housing 12 has a cylindrical central section 40, two conical transition sections 42, a right cylindrical end section 46 and a left cylindrical end portion 44. Housing 12 further includes a right end 48, a left end 50, a right end opening 52 and a left end opening 54. Right end section 46 defines a circulation chamber 56 having circulation passages 58. Air surrounding housing 12 is capable of circulating through circulation chamber 56 via circulation passages 58. Housing 12 is longer, and wider than vial 14. Housing 12 can be constructed of any impact resistant material, such as metal, plastic, hardened glass, etc.

Referring to FIGS. 2 and 3, vial 14 has a cylindrical neck section 60, and a cylindrical base section 62 which includes a curved shoulder section 64. Vial 14 has an exterior wall 66 and an interior wall 68. Interior wall 68 defines a sensor chamber 70. Sensor cavity 70 is capable of housing temperature sensor 16. Interior wall 68 and exterior wall 66 in base section 62 are standard wall thicknesses. Exterior wall 66 in neck section 60 and exterior wall 66 of shoulder 64 are also standard wall thicknesses. Base section 62 is 1.57±0.08 inches (40±2 millimeters) in length, while neck section 60 is a minimum of 1.38 inches (35 millimeters) in length. Neck section 60 has a width "A" of 0.16 inches (40 millimeters). Base section 62 has a width "B" of 0.59±0.02 inches (15.0±0.5 millimeters). Sensor chamber 70 has a minimum width "C" of 0.193 inches (4.95 millimeters). Sensor chamber 70 also has a length "D" of 1.06±0.08 inches (28±2 millimeters). Vial 14 is made of a chemically inert material, such as 7740 Pyrex. In use, neck section 60 is sealed in a leak proof manner with a neck seal 72. Vial 14 is positioned within housing 12 such that body 62 and a smaller portion of neck 60 are not exposed to the ambient temperature outside of housing 12. A greater portion of neck 60 is positioned within circulation chamber 56 as shown in FIG. 2. The portion of neck 60 in circulation chamber 56 is exposed to the ambient temperature of the atmosphere outside of housing 12.

Referring to FIG. 2, temperature sensor 16 includes a pair of electrical leads 74 which exit housing 12 via left end opening 54 in a shielded cable 76. It is recommended that leads 74 which are insulated from each other be coiled so as to contact the interior wall 68 and be as thin as possible to prevent exterior heat from reaching sensor 16. For example, in the embodiment 10, the leads 74 are of a thickness in the order of approximately 0.012 inches. Sensor 16 can be any conventional type temperature sensor capable of detecting temperature and generating an electrical signal (not shown), such as a semiconductor type temperature sensor, marketed by National Semiconductor under an "LM335" designation, a Resistance Temperature Detector type temperature sensor, a thermostat temperature sensor, or a thermocouple type temperature sensing device. It is critical to prevent ambient temperatures from contacting temperature sensor 16. Such contact eliminates accurate temperature sensing of substance 90 in vial 14.

Temperature control element 18 can be a conventional electrical heating coil wrapped about base section 62 of vial 14. It is recommended that nichrome wire be used as temperature control element 18 but, any other suitable heater can be utilized, such as a peltier heater/cooler. Temperature control element 18 has at least one electrical lead 78 which interconnects heater element 18 with a power source 80 (see FIG. 4) through the shielded cable 76. Typically, power from power source 80 is regulated by computer 82 (see FIG. 4). The exact specifications for temperature control element 18 are dependent upon the type of substance (to be discussed hereinafter) disposed in vial 14, and on power supply voltage used to regulate the heater.

Double-sided tape 22 can be of conventional manufacture and is utilized to secure temperature control element 18 between aluminum foil 20 and vial 14. Aluminum foil 20 is also of conventional design and is utilized to effect even heat transfer from temperature control element 18 to vial 14.

Encapsulant 26 is placed about the vial 14 and is used to physically encapsulate base section 62 of vial 14, aluminum foil 20, double-sided tape 22 and temperature control element 18. Typically, encapsulation 26 is some form of a room temperature vulcanizing material that may be applied as a liquid. Wrapped about encapsulant 26 is a layer of prefabricated foam insulation 24. Foam 24 is positioned about encapsulant 26 to reduce heat exchange rates between vial 14 and housing 12.

Sealant 28 is placed about vial 14, as shown, to further insulate vial 14 and to make probe 10 water proof. Sealant 28 is a room temperature vulcanizing sealant which is insoluble in water. Sealant 28 is also placed about temperature sensor 16, electrical leads 74 and 78 and cable 76. The insulation of temperature sensor 16 and vial 14 is critical. Opening 54 of housing 12 is sealed by sealant 28 to prevent moisture entry. Improper insulation of vial 14 and sensor 16 will prevent the present invention from functioning.

Disposed within vial 14 is a substance 90. Typically, substance 90 has a preselected melting point temperature in excess of the ambient temperature. Thus, substance 10 is a solid when exposed to the ambient temperature outside housing 12. It should be recognized that the melting point temperature of substance 90 may be lower than the ambient temperature if suitable temperature control elements 18 are used. Substance 90 is sealed within vial 14 by a neck seal 72. Use of Glacial Acetic Acid, $CH_3OOH$ having a melting point of 16.60° C. (61.88° F.) is recommended when the probe is to operate in near 0° C. (32° F.) environments. Other substances 90 with other melting point temperatures may be used, such as water, when such may be appropriate. In the case of water as substance 90, vial 14 may be constructed of teflon to avoid rupture when the water freezes.

FIG. 4 illustrates a first alternative embodiment of the present invention in which probe 10 is utilized in a probe system which is referred to by general reference character 100. Components of system 100 similar to components in FIGS. 1-3 carry their same reference number distinguished by a prime designation. System 100 includes probe 10', a computer 82 and a power source 80. Power source 80 is designed to drive computer 82, sensor 16 and heater element 18. Computer 82 has a long term memory for storing sensor signals from sensor 16. Computer 82 also regulates heater element 18 and sensor 16. Typically, computer 82 includes a microprocessor (not shown), an analog-to-digital converter (not shown) and an amplifier (not shown).

FIG. 5 is a graphical representation of the time-temperature cooling function of substance 90 referred to by general reference number 110. Graph 110 has a horizontal axis 112, and a vertical axis 114. Horizontal axis 112 represents time intervals, such as thirty second time intervals, and vertical axis 114 represents temperature in preselected increments, such as tenths of a degree. Typically, axes 112 and 114 decrease as they approach the intersections of axes 112 and 114.

In use, probe 10 is operated in an ambient temperature below the melting point of substance 90. When calibration is desired, substance 90 is heated via heater element 18, to a temperature in excess of its melting point. In the case of Glacial Acetic Acid such a temperature would be greater than 16.6° C. (61.88° F.). During heating, substance 90 undergoes a phase change and becomes a liquid. When a preselected elevated temperature is achieved, such as 18° C. (64.4° F.) when Glacial Acetic Acid is used, heating is terminated. Subsequent to heating, substance 90 is allowed to cool. The initial decrease in the temperature of substance 90 as a function of time is represented as a negative sloped curve 116. When the temperature of substance 90 is near its melting point temperature it either increases for a short time interval, represented as a positive curve 118, and then remains constant for a period of time or it simply plateaus as illustrated in graph 110 by a flat curve 120. Curves 118 and 120 are indicative of substance 90 undergoing a liquid-to-solid phase change. The flat curve 120 represents the release of energy, known as the molecular heat of fusion, from substance 90. Such an energy release occurs when liquid solidifies.

Positive curve 118 occurs primarily when substance 90 is allowed to super cool. During super cooling substance 90 cools to a temperature below its melting point without undergoing a phase change. Usually, vibration or impurities in a substance such as nucleation substances, which may include ground glass, finely ground sand or other preselected substances that assist initiation of a phase change, will miminize the effect of super cooling, but, when such are not present a substance can cool to temperatures greatly below the substance's melting point. When such super cooling transpires the substance may never plateau at its melting point temperature when it does undergo its liquid-to-solid phase change. To avoid such extreme super cooling, seed crystals (not shown) are utilized. The seed crystals are in contact with substance 90. Seed crystals, are of the same molecular structure as substance 90, and provide a catalyst for the phase change eliminating super cooling. The seed crystals in probe 10 are located in the neck section 60 of vial 14 adjacent neck seal 72. As shown in FIG. 2 a portion of neck section 60 extends into circulation chamber 56. By allowing such extension a portion of vial 14 and a quantity of substance 90 are always in contact with the ambient temperature outside housing 12. As discussed, such an ambient temperature is lower than the melting point of substance 90 and therefore prevents a portion of substance 90 from liquifying.

The positive curve 118 and the near flat curve 120 provide means to determine when substance 90 has reached its melting point temperature. After substance 90 has released its heat of fusion and solidified, its temperature begins to decrease over time, and such is graphically represented on graph 110 as a negative curve 122.

To determine when substance 90 is undergoing its liquid-to-solid phase change, computer 82 takes temperature readings, at preselected time intervals, while substance 90 is cooling. Computer 90 calculates the rate of change of the temperature. When a predetermined rate of change has occurred, the computer waits for a first preselected time period. Once the first time period has elasped a preselected time period is commenced. After the second time period has elasped substance 90 is at its melting point temperature. The first and second time periods and the predetermined rate of change are dependent on the known characteristics for the temperature probe 10, sensor 16, substance 90 and computer 82. Typically the phase change is indicated by a sharp decrease in the rate of change of the temperature of the substance.

Computer 82 may at this point recalibrate sensor 16 using the known melting point temperature of substance 90 as a constant calibration point using a calibration factor stored in a non-volatile portion of the computer. Such calibration is unaffected by electronic drift. Once calibrated, temperature sensor 16 and probe 10 may be used as a standard to calibrate other non self-calibrating probes by conventional methods.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A self-calibrating thermostat apparatus comprising:
a housing;
a substance within the housing, the substance having a solid phase, a liquid phase and a melting point which melting point is at a temperature in excess of the ambient temperature surrounding the housing;
container means disposed within the housing the containing the substance in a leak proof manner;
the housing has two end portions joined by a central section, said central section being greater in area than said end portions, and at least one end portion has portions defining circulation apertures through which air from the enviovment surrounding the housing may pass into said end portion having said circulation apertures, the container means is a vial having a neck section and a base section, said base section being of a greater area than said neck section, and a predetermined portion of said neck section is within said end portion of the housing having said circulation apertures so that said portion of said neck section is exposed to the ambient termperature;
a temperature sensor adjacent the container means and capable of generating electrical signal responsive to temperature variations;
temperature control means positioned about the container means for heating the substance;
a layer of encapsulating material about the heating means;
a layer of insulation means positioned intermediated the encapsulating material and the housing for isothermally insulating the container means from the environment outside of the housing; and
a sealant means positioned about the inside of the housing for sealing the container within the housing in a leak proof manner.

2. The apparatus of claim 1 wherein
the temperature sensor is in electrical communication with a digital computer having a long term memory.

3. The apparatus of claim 2 including
a power supply within the computer and connected for driving the temperature sensor and the temperature control means, the digital computer being connected to regulate the temperature sensor and the temperature control means.

4. The apparatus of claim 1 wherein
the temperature sensor includes a thermocouple temperature sensing device.

5. The apparatus of claim 1 wherein
the temperature sensor includes a resistance temperature detection device.

6. The apparatus of claim 1 wherein
the temperature sensor includes a thermistor temperature sensor device.

7. The apparatus of claim 1 wherein
the temperature sensor includes a semiconductor.

8. The apparatus of claim 1 wherein
the base section of the vial has portions defining a temperature sensor chamber capable of housing the temperature sensor within said base section.

9. The apparatus of claim 8 wherein
the temperature sensor is in electrical communication with a digital computer having a long term memory, the digital computer includes a power supply connected for driving the temperature sensor and the heating means, and the digital computer being connected to regulate the temperature sensor and the heating means.

10. The apparatus of claim 9 wherein
the substance is Glacial Acetic Acid, the heating means is nichrome wire, the sealant material is a room temperature vulcanizing sealant, the layer of prefabricated insulation is plastic foam insulation, and the temperature sensor includes a semiconductor.

11. A self-calibrating thermostat apparatus comprising:
a housing;
a susbstance within the housing, the substance having a solid phase, a liquid phase and a melting point which melting point is at a temperature in excess of the ambinet temperature surrounding the housing;
container means disposed within the housing for containing the substance in a leak proof manner;
the housing has two end portions joined by a central section, said central section being greater in area than said end portions, and at least one end portion has portions defining circulation apertures through which air from the environment surrounding the housing may pass into said end position having said circulation apertures, the container means is a vial having a neck section and a base section, said base section being of a greater area than said neck section, and a predetermined portion of said neck section is within said end portion of the housing having said circulation apertures so that said portion of said neck section is exposed to the ambient temperature;
a temperature sensor adjacent the container means and capable of generating electrical signals responsive to temperature variations;
temperature control means positioned adjacent the container means for heating the substance; and
a sealant means positioned about the inside of the housing for sealing the container within the housing in a leak proof manner.

12. The apparatus of claim 11 wherein
the temperature sensor includes a thermo-couple sensing device.

13. The apparatus of claim 11 wherein
the temperature sensor includes a resistance temperature detection device.

14. The apparatus of claim 11 wherein
the temperature sensor includes a thermistor temperature sensor device.

15. The apparatus of claim 11 wherein
the base section of the vial has portions defining a temperature sensor chamber capable of housing the temperature sensor within said base section.

16. A self-calibrating thermostat apparatus comprising:
a housing;
a susbstance within the housing, the substance having a solid phase, a liquid phase, and a melting point which melting point is at a temperature in excess of the ambient temperature surrounding the housing;

container means disposed within the housing for containing the substance in a leak proof manner;

the housing has at least one end portion with portions defining circulation apertures through which air from the environment surrounding the housing may pass into said end portion having said circulation apertures, the container means has a neck with a predetermined portion of said neck section being within said end portion of the housing having said circulation apertures so that said portion of said neck section is exposed to the ambient temperature;

a temperature sensor adjacent the container means and capable of generating electrical signals responsive to temperature variations;

temperature control means positioned adjacent the container means for heating the substance; and a sealant means positioned about the inside of the housing for sealing the container within the housing in a leak proof manner.

17. The apparatus of claim 16 wherein
the temperature sensor includes a thermo-couple sensing device.

18. The apparatus of claim 16 wherein
the temperature sensor includes a resistance temperature detection device.

19. The apparatus of claim 16 wherein
the temperature sensor includes a thermistor temperature sensor device.

20. The apparauts of claim 16 wherein
the temperature sensor is in electrical communications with a digital computer having a long term memory, the digital computer includes a power supply connected for driving the temperature sensor and the temperature control means, and the digital computer being connected to regulate the temperature sensor and the temperature control means.

* * * * *